United States Patent [19]

Tajima et al.

[11] Patent Number: 5,023,924

[45] Date of Patent: Jun. 11, 1991

[54] SPEED CONTROL APPARATUS FOR MOVABLE EQUIPMENT

[75] Inventors: Fumio Tajima, Ibaraki; Hiroshi Katayama, Hitachi; Kunio Miyashita, Hitachi; Shigeki Morinaga, Hitachi; Seiichi Narushima, Ibaraki, all of Japan

[73] Assignee: Hitachi, Ltd., Tokyo, Japan

[21] Appl. No.: 473,915

[22] Filed: Feb. 2, 1990

[30] Foreign Application Priority Data

Feb. 6, 1989 [JP] Japan .................................. 1-025814
Mar. 18, 1989 [JP] Japan .................................. 1-066732

[51] Int. Cl.$^5$ .............................................. H02P 6/00
[52] U.S. Cl. .................................... 388/811; 388/815; 388/906; 318/254; 364/157; 364/161
[58] Field of Search ...................... 388/802, 810–815, 388/819–823, 912, 906, 927–928, 809; 364/160–162, 157, 160–162; 318/609–610, 629, 254

[56] References Cited

U.S. PATENT DOCUMENTS

| | | | |
|---|---|---|---|
| 3,896,348 | 7/1975 | Loderer | 388/819 |
| 3,915,365 | 10/1975 | Lace | 388/820 X |
| 3,916,277 | 10/1975 | Haydon | 388/820 |
| 3,936,710 | 2/1976 | Tanikoshi | 388/820 |
| 3,974,428 | 9/1976 | Hafle | 388/812 |
| 4,429,262 | 1/1984 | Utenick | 318/254 |
| 4,604,559 | 8/1986 | Hawkes et al. | 388/832 X |
| 4,622,500 | 11/1986 | Budelman, Jr. | 388/811 |
| 4,651,068 | 3/1987 | Meshkat-Razau | 318/254 |
| 4,651,070 | 3/1987 | Trinan et al. | 388/810 |
| 4,755,729 | 7/1988 | Gotou | 388/810 |
| 4,806,836 | 2/1989 | Webb | 364/161 X |
| 4,821,168 | 4/1989 | Gotou | 364/161 X |
| 4,841,207 | 6/1989 | Cheyne | 388/811 |
| 4,855,652 | 8/1989 | Yamashita et al. | 388/838 X |

FOREIGN PATENT DOCUMENTS

| | | |
|---|---|---|
| 0079694 | 6/1980 | Japan . |
| 0121144 | 3/1984 | Japan . |
| 0154863 | 2/1985 | Japan . |
| 0203885 | 9/1986 | Japan . |

OTHER PUBLICATIONS

Minimization of Torque Ripple in Brushless DC Motor Drives; vol. IA-22 IEEE No. 4 July/Aug. 1986 NY.

Primary Examiner—William M. Shoop, Jr.
Assistant Examiner—David Martin
Attorney, Agent, or Firm—Antonelli, Terry, Stout & Kraus

[57] ABSTRACT

In order to provide a speed control apparatus for a movable equipment having small torque ripples and speed variation, the present invention has a speed control means which comprises a driver for providing a current or a voltage having a magnitude corresponding to the instructed speed, a speed detection circuit for detecting a speed on the basis of a signal from the speed detector and a microcomputer for driving the driver by comparing the speed instruction signal with a speed signal obtained from the speed detection circuit. The microcomputer includes a harmonic wave component detecting means for detecting a harmonic wave component contained in a speed variation mode which is obtained from the speed detection circuit and has a function of making the gain of a speed control system variable by the harmonic wave component detected by the harmonic wave component detecting means.

11 Claims, 8 Drawing Sheets

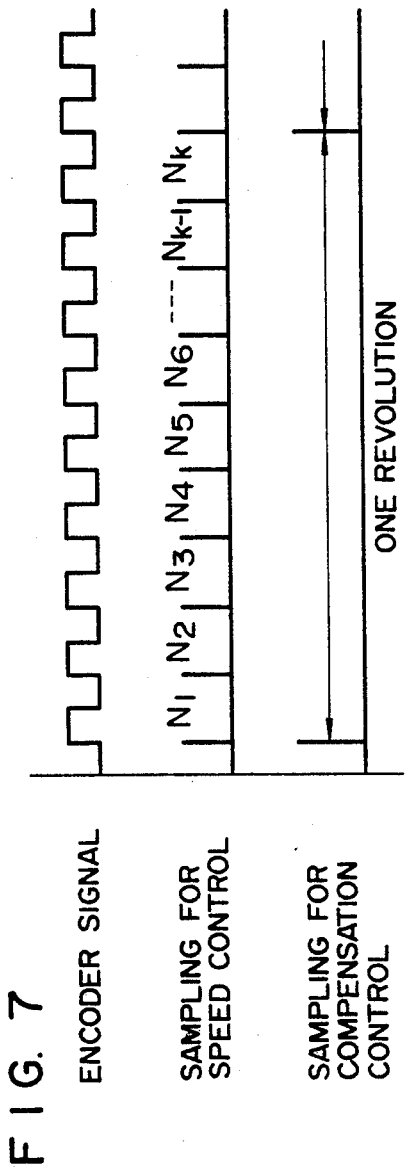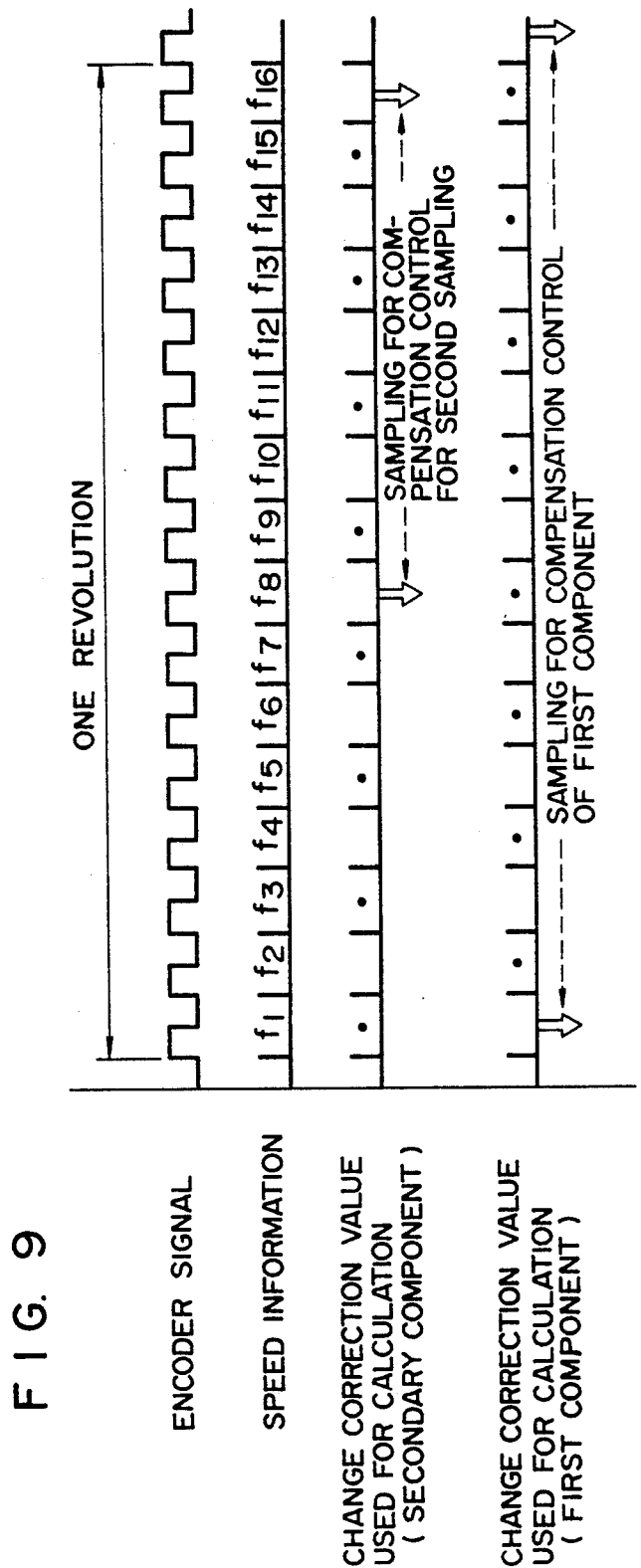

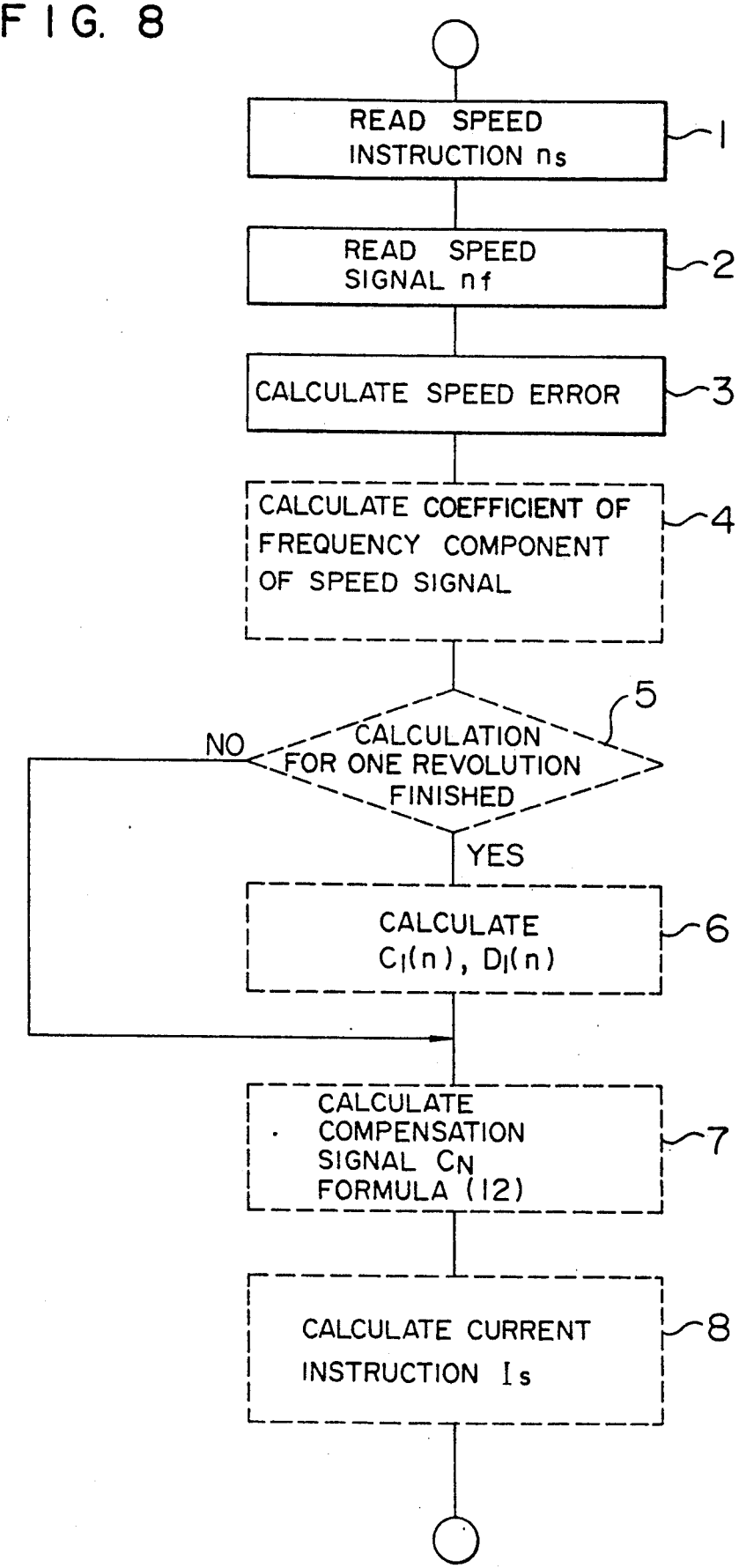

SPEED CONTROL APPARATUS FOR MOVABLE EQUIPMENT

BACKGROUND OF THE INVENTION

1. Field of the Invention

The present invention relates to a speed control apparatus for a movable equipment. More specifically, the present invention relates to a control apparatus which should not change the speed during operation, such as, for example, a control apparatus which is suitable for application to a motor for a VTR and a digital control apparatus which is suitable for the type of control apparatus.

2. Description of the Related Art

A drive motor for a VTR (video tape recorder) is required to have a constant speed. Variation in the speed (nonuniformity in revolution, speed ripple, torque ripple) disturbs the picture of a VTR, thereby greatly impairing the reliability and the quality of the VTR.

A conventional apparatus in this field mainly uses a DC motor. A brushless motor, which allows the speed to be varied freely and simply, has recently been increasingly adopted for such an apparatus.

Since a brushless motor is not provided with mechanical brushes, various problems caused by abrasion of brushes and commutators or abrasion powder of the brushes and commutators are eliminated. On the other hand since the number of the interlinking magnetic fluxes at conducting coils of a 120-degree conducting type brushless motor is different depending upon the position of the rotor, a torque ripple is caused, thereby producing nonuniform rotation (speed variation) during operation.

If it is assumed that the number of interlinking magnetic fluxes of the coil of a driving phase is $K(\theta)$ ($\theta$ represents a position of the movable equipment), the torque generated is represented by $K(\theta)I$ (I represents a current passing through the coils). When a current is constant, a torque ripple is generated in proportional to $k(\theta)$ like the number of interlinking magnetic fluxes.

An example of making the current $1/K(\theta)$ in correspondence with the rotational position of the rotor is disclosed in Japanese Patent Laid-Open Publication 79694/1980.

This is a method of obtaining a constant torque by storing the information on $1/K(\theta)$ corresponding to the rotational position of the rotor in a ROM (Read Only Memory) in advance and correcting the current instruction $1/K(\theta)$ corresponding to the rotational position of the rotor.

In the invention disclosed in Japanese Patent Laid-Open Publication 79694/1980, however, since the number $K(\theta)$ of the interlinking magnetic fluxes varies due to the nonuniformity in the magnetized state of a permanent magnet and the arrangement and the wound state of coils, it is difficult to accurately detect the compensation signal $1/K(\theta)$ in each motor.

In a brushless motor having a core, the cogging torque also generates a large revolution variation. Since the magnitude and the phase of the cogging torque greatly vary due to nonuniform magnetized state and assembling error, it is impossible to perfectly compensate the torque ripple and speed variation on the basis of the fixed data stored in the ROM.

In the case in which the cogging torque and the torque ripple are unknown, it is possible to suppress the torque ripple by a learning control method in which independent integration terms used exclusively for speed control are prepared independently in correspondence with the rotational positions and these integration terms are changed over sequentially in correspondence with the position of the rotor.

However, this method requires many RAMs (Random Access Memories) in correspondence to the number of pulses generated from an FG (Frequency Generator), thereby disadvantageously making a control apparatus complicated and expensive.

And, as a system for eliminating nonuniformity in revolution, the present inventors proposed a system for reducing the nonuniformity in revolution by detecting the harmonic wave component in nonuniform revolution and correcting a current instruction (torque instruction) by this harmonic wave component, and filed this system as Japanese Patent Laid-Open Publication 218380/1989. The main structure of the system is composed of an object of control (motor) for producing a controlled variable (number of revolutions), a detecting portion (encoder, counter) for detecting the controlled variable (number of revolutions), a discriminating portion for calculating the deviation from the target value and the measured value output from the detecting portion, and a control unit for determining the manipulated variable output to the object of control (motor) from the deviation. The control unit and the discriminating portion are provided with digital operators such as a microcomputer. This apparatus is a digital control apparatus for outputting a manipulated variable at every predetermined sampling period on the principle of detecting a variation component at every predetermined sampling period which is contained in the manipulated variable (number of revolutions) and the deviation and reducing the varying harmonic wave component contained in the object of control by correcting the manipulated variable by a correction value having the same period as the variable harmonic wave component.

In the above-described prior art, since the fluctuation of a controlled variable contains a plurality of harmonic wave components, it is necessary to provide a plurality of harmonic wave component detecting and correcting means. In this case, since two harmonic wave components are detected and corrected in one sampling time, compensation takes a long time, and since the sampling for compensation is the same in a long-period harmonic wave component detecting and correcting portion and a short-period harmonic wave component detecting and correcting portion, it is impossible to shorten the response time of the short-period harmonic wave component detecting and correcting portion.

SUMMARY OF THE INVENTION

It is a first object of the present invention to provide a speed control apparatus for a movable equipment which is capable of reducing a torque ripple and speed variation easily even when an object of control is replaced and of minimizing the number of necessary RAMs.

It is a second object of the present invention to provide a digital control apparatus which is capable of shortening the response times of the respective harmonic wave component detecting and correcting portions and reducing the time required for one compensation.

The method of achieving the first object comprises the steps of detecting the harmonic wave component (frequency component) contained in the actual speed variation mode of the motor and operating an electronic means (microcomputer) for adjusting the current or voltage instruction being supplied to the driver, thereby eliminating or reducing the detected harmonic wave component.

More specifically, the speed control means includes a driver (INV) for providing a current or voltage having a magnitude corresponding to the instructed speed, a speed detection circuit (COUNT) for detecting a speed on the basis of a signal from the speed detector, and a microcomputer (MC) for driving the driver (INV) by comparing the speed instruction signal with a speed signal obtained from the speed detection circuit (COUNT); and the microcomputer including a harmonic wave component detecting means for detecting a harmonic wave component detecting means contained in a speed variation mode which is obtained from the speed detection circuit, and having a function of making the gain of the control system variable by the harmonic wave component detected by the harmonic wave component detecting means.

The above-described second object is achieved by staggering the timings either for detection or for outputting a correction value by a plurality of harmonic wave component detecting and correcting portions.

By staggering the timings for detection, it is possible to reduce the number of times of detection in one sampling. And, by varying the sampling periods of detection and compensation from each other, it is possible to shorten the response time for compensation.

BRIEF DESCRIPTION OF THE DRAWINGS

The drawings show an embodiment of the present invention, wherein

FIG. 7 shows the state of sampling signals from a frequency generator;

FIG. 8 is a flowchart of a microcomputer for the process of reducing the speed variation;

FIG. 9 is a view showing principle of a harmonic wave component detecting method which is suitable for a control unit according to the above-described embodiment.

DETAILED DESCRIPTION OF THE PREFERRED EMBODIMENTS

The present invention will be described hereinafter with reference to the embodiment shown in the accompanying drawings.

Figure 1:
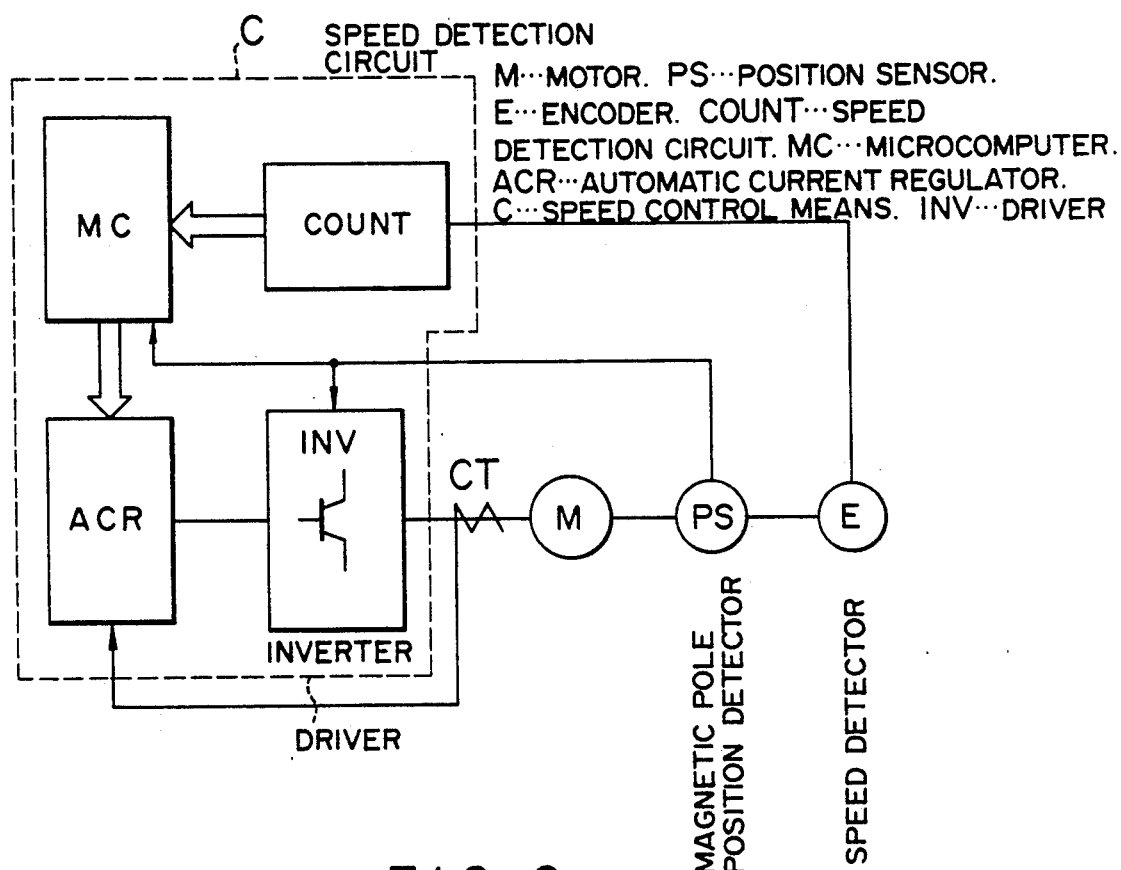
FIG. 1 is a fundamental block diagram.

FIG. 1 is a speed control apparatus used for a brushless motor as a movable equipment.

The symbol M represents a motor. The torque and the speed periodically fluctuate within one revolution of the motor M. The motor M may be either of a rotary type or of a rectilinear type. An object of control, the speed of which changes when being connected to a load, is called a movable equipment. The symbol PS denotes a magnetic pole position detector for detecting the position of a magnetic pole of, especially, a rotor. The magnetic pole position detector PS is used for switching the phase current of the motor M. The internal structure of the motor is not shown. A brushless motor is generally so designed as to electronically detect the position of the rotor and apply a current to two phase coils selected in accordance with the position of the rotor. The symbol E represents a speed detector composed of an encoder or the like attached to the rotary shaft of the motor M. Apart from the encoder, a frequency generator, a tachometer generator, and a pulse generator may be adopted as a speed detector.

The symbol INV denotes an inverter, which is a driver for driving the motor. The inverter has three arms generally composed of six switching elements for both positive and negative poles and applies a current to two selected phase windings, the magnitude of the current being variable. The symbol ACR represents an automatic current regulator which receives the detected current value from a current transformer CT.

The symbol MC denotes a microcomputer having a function which will be described later. The symbol COUNT represents a speed detection circuit which is actually composed of a counter. Speed is detected by counting the number of pulses detected in a predetermined sampling time or detecting the pulse interval. The main part of a speed control means C is composed of the microcomputer MC, the automatic current regulator ACR, the driver (inverter) INV and a speed detection circuit COUNT.

The speed detected by the speed detection circuit COUNT is transmitted to the microcomputer MC, and the signal from the magnetic pole position detector PS is also transmitted to the microcomputer MC and the driver INV. The microcomputer MC processes these signals so as to control the on/off operation of the switching elements of the drivers and regulate the magnitude of the current value.

Figure 2:
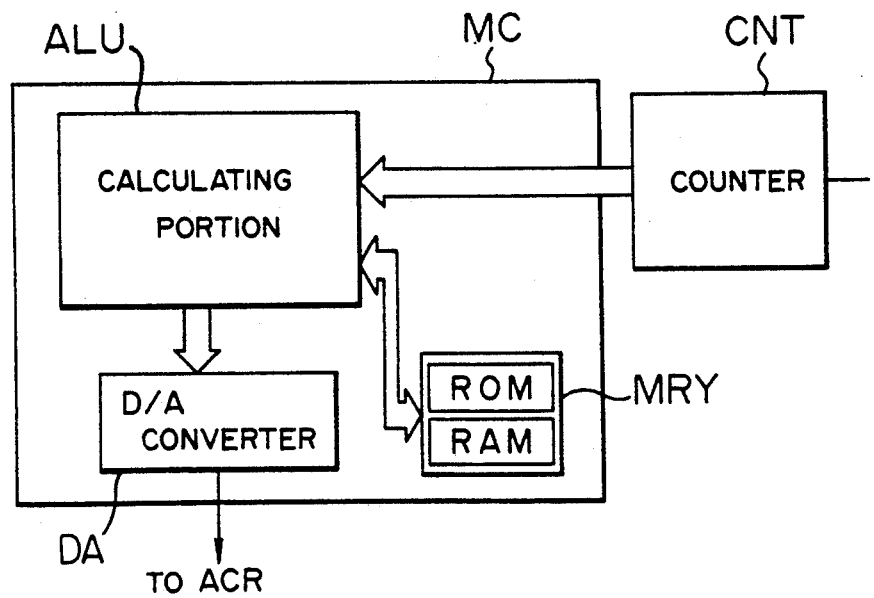
FIG. 2 shows the internal structure of a microcomputer.

The microcomputer MC has an internal structure shown in FIG. 2. That is, the microcomputer MC is composed of an arithmetic and logic unit ALU, the counter CNT, a D/A converter DA and a memory MRY. The counter CNT measures a period of a pulse signal from an encoder E and detects the speed of the motor from a reciprocal of the period of the pulse signal. The arithmetic and logic unit ALU receives a signal from the counter and calculates a speed error by comparing the signal from the counter CNT and an instruction speed stored at the ROM of the memory MRY. A compensation signal is next produced on the basis of the thus-calculated speed error signal. The compensation signal is stored in the RAM of the memory MRY every time it is produced and the RAM is renewed by the new data. The arithmetic and logic unit ALU further has an element for detecting the harmonic wave component contained in the actual speed mode of the motor M detected by the speed detection circuit COUNT. The object of the detection of the harmonic wave component is a fundamental wave component and, in particular, a wave component which causes a torque ripple such as the third or fifth harmonic wave component. Although the counter CNT is located outside the microcomputer MC in FIG. 2, the counter CNT may be provided inside the microcomputer MC.

Figure 3:
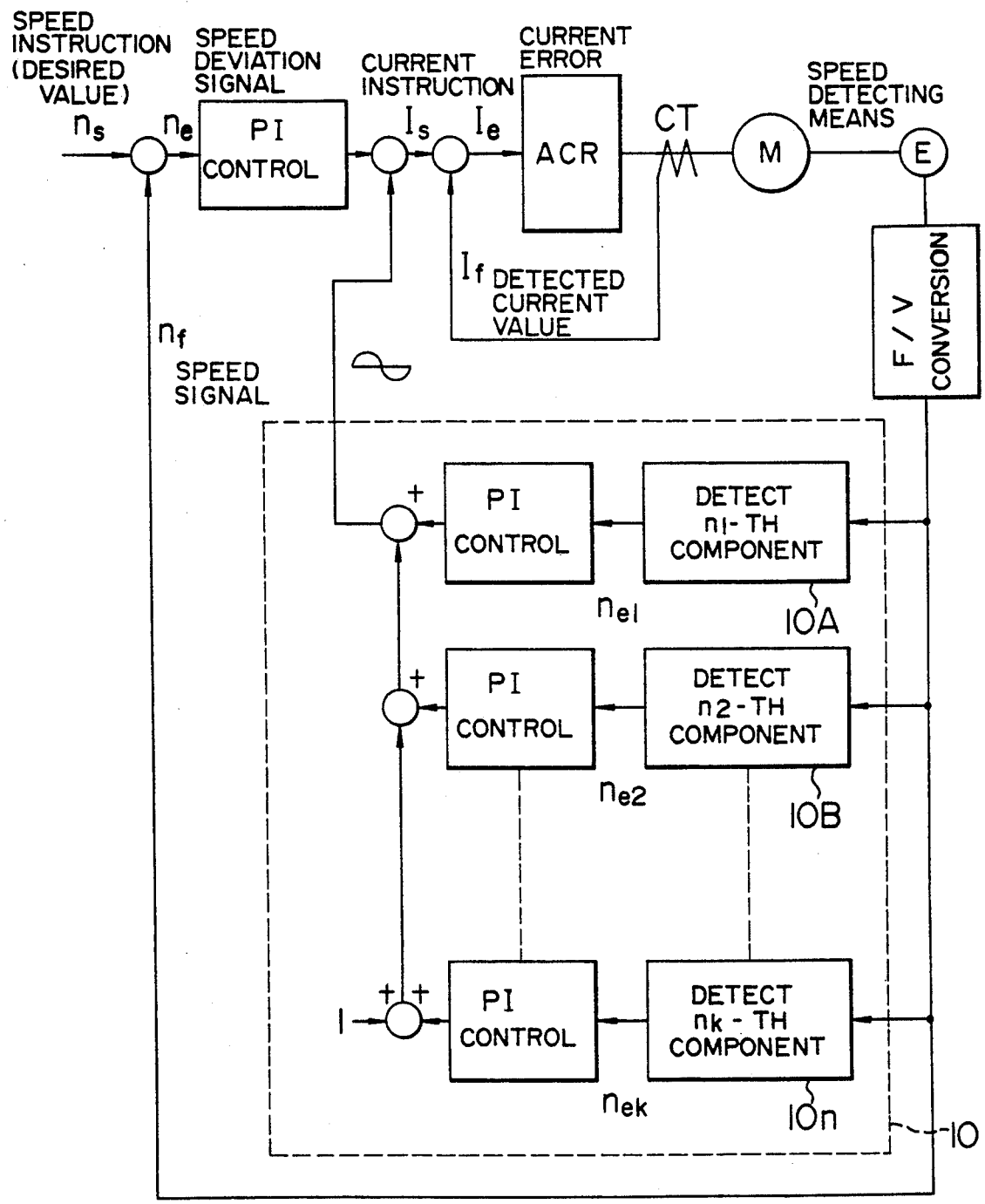
FIG. 3 shows the circuit structure including a harmonic wave component detecting means.

FIG. 3 is a block diagram of a specific speed control apparatus. In FIG. 3, a speed signal, which is a controlled variable, is detected by counting the number of pulses output from a reference oscillator (a clock or a counter provided inside the microcomputer) and counted during a pulse interval of the speed detector (encoder) E and obtaining the reciprocal of the counted number of pulses. The thus-obtained speed signal $n_f$ is introduced to the microcomputer. Within the microcomputer, by processing software, a speed deviation signal $n_e$ is calculated from the difference between a speed instruction signal $n_s$ and the speed signal $n_f$ and after a proportional-plus-integral control (PI control), a new current instruction signal $I_s$ is calculated from the current instruction signal $I_s$ based on the speed instruction signal $n_s$ and a detected current value $I_f$ obtained from the current transformer CT, whereby a current is applied to the motor M, which is an object of control, via the automatic current regulator ACR. Additionally, the inverter Inv in FIG. 1 is not shown in FIG. 3.

Although the above-described entire structure is well known in the prior art the apparatus of the present invention further has a novel element, namely, a harmonic wave component detecting means 10 shown by the broken line in FIG. 1. The harmonic wave component detecting means 10 calculates a given harmonic wave component (frequency component) contained in the speed signal $n_f$ or the speed deviation signal ne, produces a compensation signal by the proportional control (P control) or the proportional-plus-integral control (PI control) of the harmonic wave component and adds the proportional control signal or the proportional-plus-integral control signal to the current instruction signal $I_s$ (i.e., the gain of the control system is changed by the harmonic wave contained in the speed signal). The reference numerals 10A, 10B, 10n denote the $n_1$-th, $n_2$-th, and $n_k$-th harmonic wave component detecting means, respectively. PI control means are connected to the respective component detecting means, and the output signals are collected into one compensation signal with reference 1 added thereto and multiply the current instruction signal $I_s$. The harmonic wave component being detected and the numbers thereof can be freely varied in correspondence with the motor being controlled.

Figure 4:
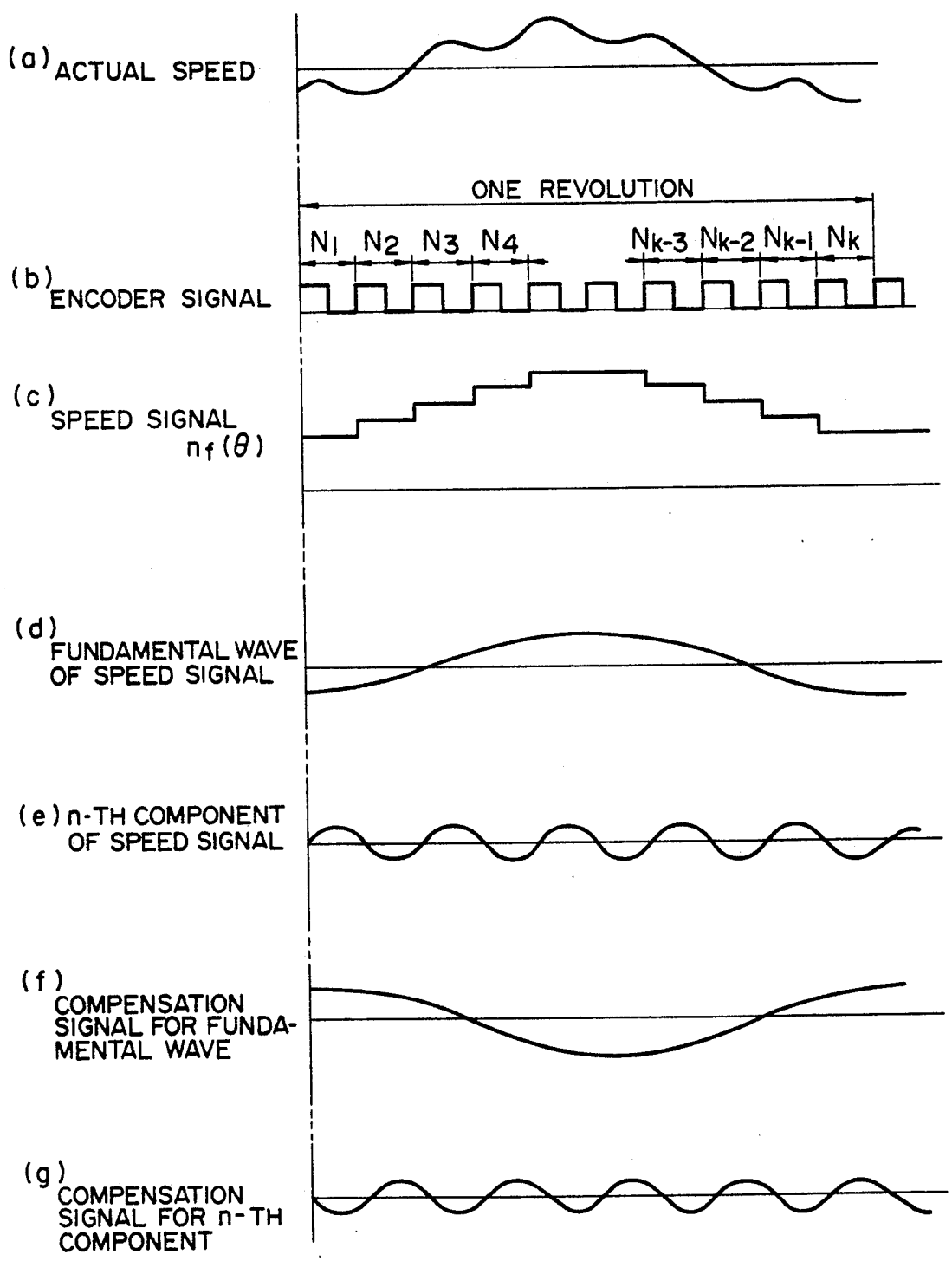
FIG. 4 shows the relationship between an encoder signal and a speed signal.

FIG. 4 shows the state of speed variation of the motor 1 during one revolution of the motor M. The number of pulses generated from the encoder E is $N_k$ per revolution of the motor M. The calculation for detecting the speed of the motor is carried one time within one pulse interval. The speed $n_f$ is obtained from the reciprocal of the number of pulses generated from the reference oscillator provided in the microcomputer within the pulse interval of the encoder E. In actually, the number of pulses is counted by the counter for detecting the speed. The speed signal $n_f$ is shown in FIG. 4.

Generally, the speed $n_f(\theta)$ can be expanded to each frequency component according to the following formula:

$$n_f(\theta) = n_0 + \sum_{n=1}^{\infty} a_n \sin\theta + b_n \cos\theta \qquad (1)$$

wherein $n_0$ represents a DC component, $a_n$ a coefficient of sine, and $b_n$ a coefficient of cosine.

The absolute value of $n_0$, $a_n$ and $b_n$ for arbitrary frequency components are expressed as follows:

$$n_0 = \frac{1}{2\pi} \int_{-\pi}^{\pi} n_f(\theta) d\theta \qquad (2)$$

$$a_n = \frac{1}{\pi} \int_{-\pi}^{\pi} n_f(\theta) \sin n\theta d\theta \qquad (3)$$

$$b_n = \frac{1}{\pi} \int_{-\pi}^{\pi} n_f(\theta) \cos n\theta d\theta \qquad (4)$$

In the embodiment shown in FIG. 4 in which the encoder E generates $n_k$ pulses per revolution of the motor M, the speed variation $n_1$ of the motor which generated $n_1$PPR (Pulse Per Revolution) is represented by the following formulas:

$$A_{N1} = \frac{2}{N_K \cdot n_1} \sum_{n=1}^{N_K} n_{fn} \sin \frac{n \cdot n_1}{N_K} \cdot 2\pi \qquad (5)$$

$$B_{N1} = \frac{2}{N_K \cdot n_1} \sum_{n=1}^{N_K} n_{fn} \cos \frac{n \cdot n_1}{N_K} \cdot 2\pi \qquad (6)$$

wherein $N_K$ represents the number of pulses per revolution, and $n_{fn}$ a speed between the (n−1)-th pulse and the (n−1)-th pulse and the n-th pulse.

Further, the speed variation N of the motor which generates $n_1$PPR (pulse per revolution) is represented by the following formulas:

$$N = A_{N1} \sin \frac{n \cdot n_1}{N_K} \cdot 2\pi + B_{N1} \cos \frac{n \cdot n_1}{N_K} \cdot 2\pi \qquad (7)$$

The correction term in the proportional control is represented by the following formula:

$$M = C_{N1} \sin \frac{n \cdot n_1}{N_K} \cdot 2\pi + D_{N1} \cos \frac{n \cdot n_1}{N_K} \cdot 2\pi \qquad (8)$$

wherein $C_{N1} = K \cdot A_{N1}$, $D_{N1} = K \cdot B_{N1}$, and K represents a proportional gain.

FIG. 4 shows the speed variation during one revolution of the motor. The same variation mode is exhibited in the next rotation of the motor and this mode is repeated thereafter.

The cardinal point of the calculation is the reference position of the rotor. The reference position is detected by utilizing the reference signal supplied from the encoder E or the magnetic pole position detection signal of the rotor which is provided by a Hall element in the case of a brushless motor. In a DC motor which does not use an encoder, the reference position may be set at a given position.

Figure 5:
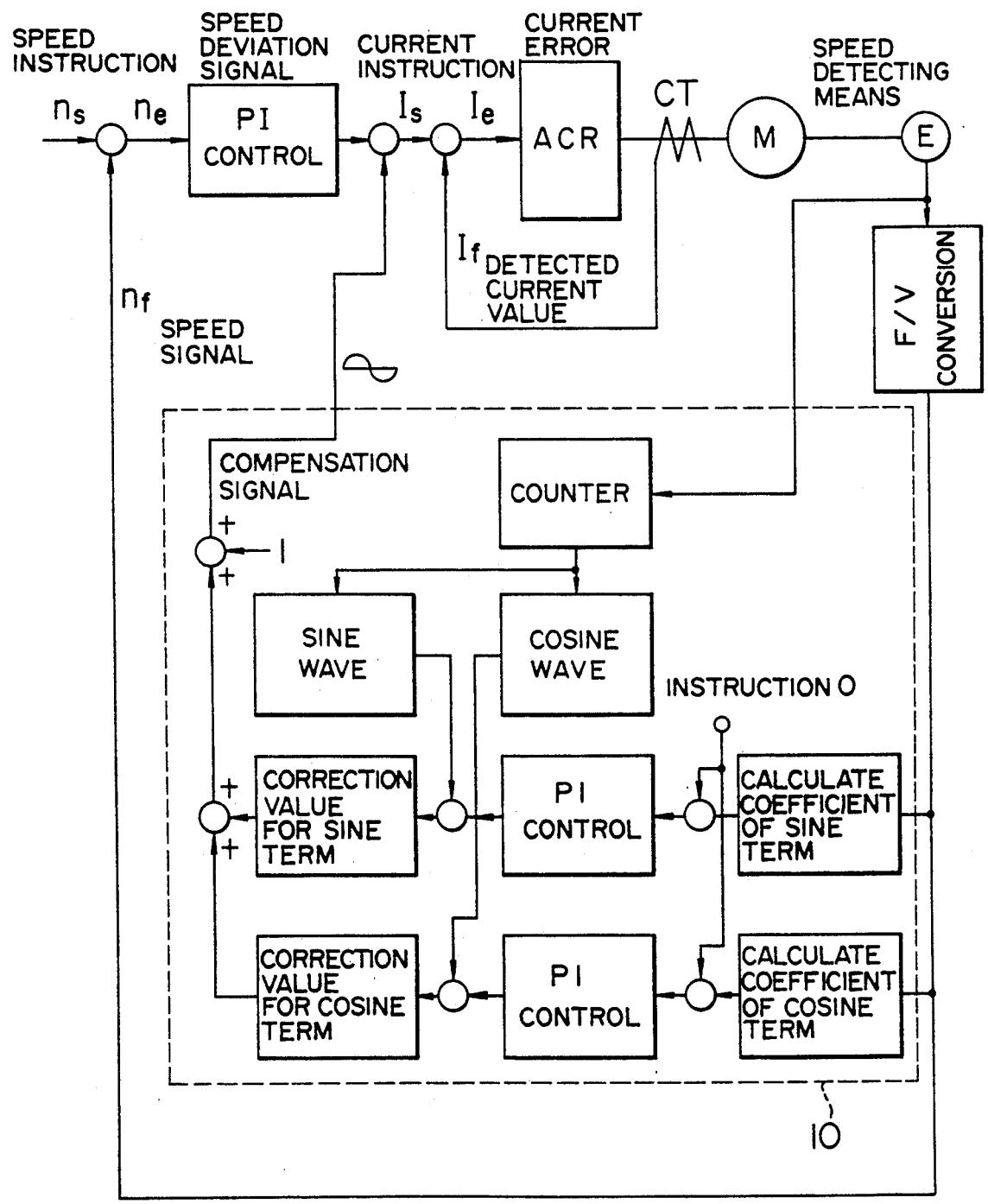
FIG. 5 shows an example of one harmonic wave component detecting means.

FIG. 5 shows an example of a system produced with our attention focused on one variation component in the block diagram shown in FIG. 3.

In the system shown in FIG. 5, the variation component is divided into two, namely, a sine term and a cosine term and the coefficient of the sine term and the coefficient of the cosine term are calculated from the formulas (5) and (6), respectively. These coefficients are subjected to proportional-plus-integral control on the assumption that the instructed coefficients of a sine term and a cosine term are zero so as to calculate a correction coefficient $C_i$ of a sine term and a correction coefficient $D_i$ of a cosine term. Further, the thus-obtained coefficients are multiplied by a sine value and a cosine value corresponding to the position of the driven portion, thereby producing a compensation signal.

More specifically, the sine term $A_{N1}$ and the cosine term $B_{N1}$ of the revolution variation of a given harmonic wave are calculated by the respective following formulas on the basis of L items of speed information obtained from the speed detection circuit:

$$A_{N1} = \frac{2}{L} K \sum_{n=1}^{L} V_n \sin\theta_n \quad (9)$$

$$B_{N1} = \frac{2}{L} K \sum_{n=1}^{L} V_n \cos\theta_n \quad (10)$$

These coefficients are subjected to proportional-plus-integral control on the assumption that the instructed coefficients of a sine term and a cosine term are zero and the correction coefficient $C_i$ of a sine term and the correction coefficient $D_i$ of a cosine term are calculated from the respective formulas, wherein an example of integral control is shown:

$$C_i(n) = C_i(n-1) + K \cdot A_{N1} \quad (11)$$

$$D_i(n) = D_i(n-1) + K \cdot B_{N1} \quad (12)$$

wherein (n) represents the calculated value at the current time and (n−1) represents the calculated value at the preceeding time.

The thus-obtained coefficients are multiplied by a sine value and a cosine value relating to an angle, respectively, and both products are added to each other to obtain a compensation signal $C_N$ as follows:

$$C_N = C_i(n)\sin\frac{n \cdot n_1}{N_K} \cdot 2\pi + D_i(n)\cos\frac{n \cdot n_1}{N_K} \cdot 2\pi + 1 \quad (13)$$

In this way, by calculating the variation component by dividing it into a sine term and a cosine term, the calculation is facilitated.

In the above-described technique, sine or cosine wave information is necessary. The information is stored in the ROM in advance. In an apparatus adopting a drive system which provides a sinusoidal wave current to each phase of the brushless motor, as will be described later, sine or cosine wave information stored previously in the ROM can be utilized as the information.

Figure 6:
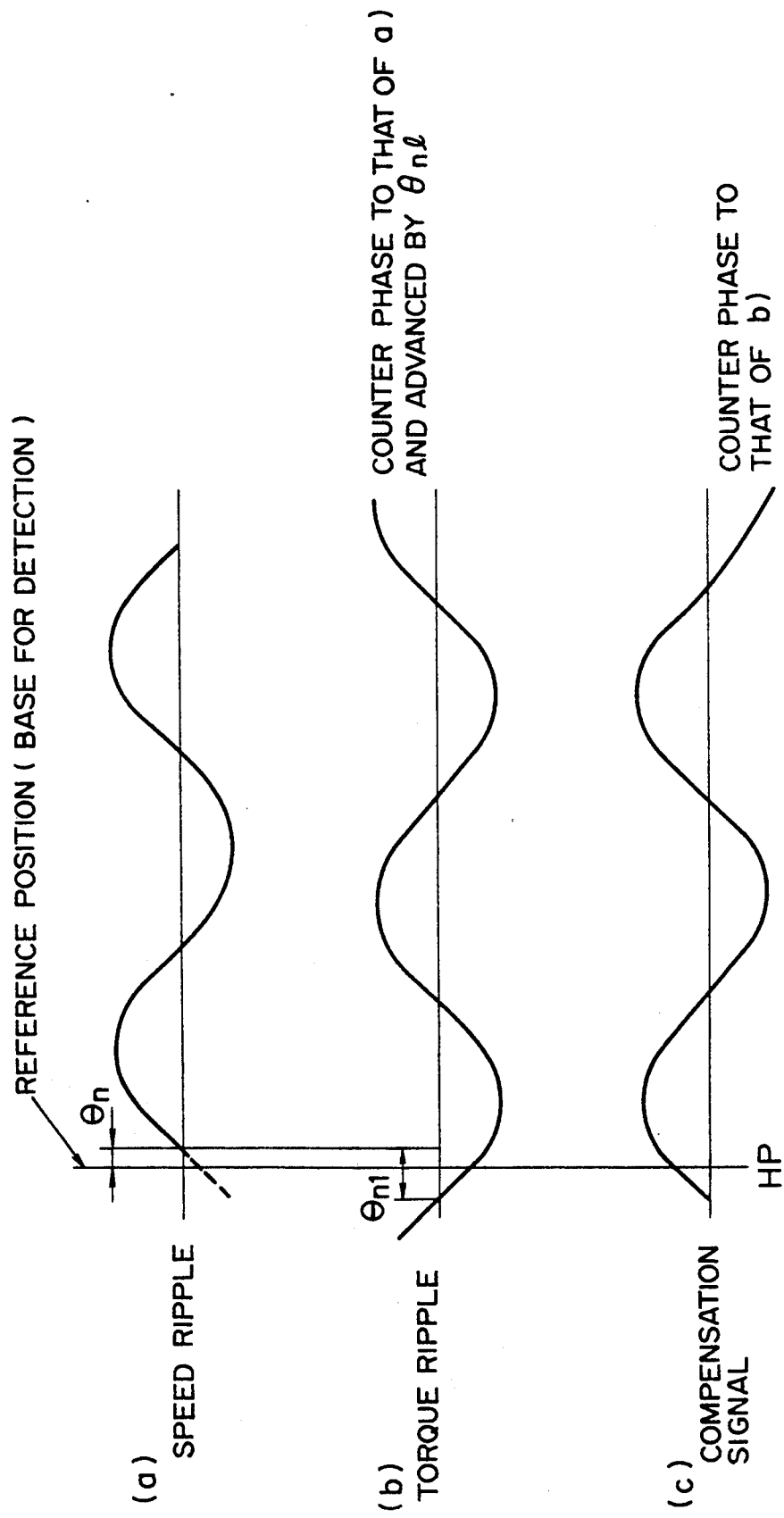
FIG. 6 is a waveform diagram for explaining a method of cancelling a speed ripple.

A method of suppressing the torque ripple and eliminating the speed ripple will be described with reference to FIGS. 4 and 6. FIGS. 4 and 6 show an example in which the torque ripple contains two frequency components. The ripple can be eliminated in the same way even when a multiplicity of frequency (harmonic wave) components are contained in the torque ripple. In many cases, since the speed ripple and the torque ripple contain a plurality of frequency (harmonic wave components), the frequency components are processed separately from each other.

The speed ripple (speed variation) is detected as a waveform shown in FIG. 6 (a) by processing the signal supplied from the encoder E in accordance with the formulas (5) to (7). The zero cross point of the speed ripple is delayed by the phase difference $\theta n$ from the reference position HP, which is the calculation starting point. In actuality, the detecting operation of one revolution of the speed ripple begins at the zero cross point.

The torque ripple, which causes the speed ripple, has a counter phase to that of the speed ripple and it is advanced by $\theta_{n1}$ from the speed ripple, as shown in FIG. 6 (b). This fact is recognized from the phenomenon that the speed ripple is not generated immediately after the torque ripple is generated due to the effect of the inertia of the motor or the like. By multiplying the compensation signal, which has a counter phase to that of the torque ripple, as shown in FIG. 6 (c), by a torque instruction signal or a current instruction signal, it is possible to remove the torque ripple and suppress the speed ripple (speed variation). Although the value $\theta_{n1}$ is different depending on the gain of the servo system, the inertia of the motor, the frequency of the torque ripple, etc., it can be neglected in low frequency components. It is generally preferable to determine $\theta_{n1}$ by calculation while taking the gain of the servo system and the like into consideration. When the value $\theta_{n1}$ is very small, a considerable effect can be expected from merely supplying the compensation signal having a counter phase to that of the speed ripple and a satisfactory effect can be obtained in the case of low-speed and low-frequency components.

In general, the torque ripple of a motor is proportional to a load. According to the above-described method, since the compensation value of the torque ripple automatically increases with a change of the load of the motor, the responsiveness to a change in the load is good.

FIG. 4 shows a specific method for reducing the speed ripple in accordance with the present invention. In FIG. 4, the curve (a) shows the actual speed variation mode of the motor. The curve (b) shows that the speed detection is carried out one time in each pulse interval.

The curve (c) shows a speed signal (current signal) obtained at each pulse interval. The signal shapes a digital stepwise waveform. The curve (d) shows a fundamental wave component (first component) of the speed signal obtained from the speed signal (c). The curve (e) shows the n-th component of the speed signal obtained from the speed signal (c). These harmonic wave components represented by the curves (d) and (e) are easily obtained by the frequency analysis calculation represented by the formulas (5) and (6). The curves (f) and (g) represent the torques produced by the variation of the compensation signal. The torque ripple components are cancelled and eliminated, so that the torque of the motor which causes the speed ripple can be cancelled by the thus-obtained torques, thereby being eliminated or reduced. FIG. 7 shows one example of a speed control system which is constructed in a digital system. In a VTR motor or the like which must be rotated at a constant speed, the speed control is generally executed at an interval equivalent to a pulse period obtained from an encoder or a frequency generator FG or several times as long an interval as the pulse period. In the example shown in FIG. 4, the pulse period is equal to the speed control period. For the calculation of the $N_k$-th speed control, the information at the $N_{k-1}$-th signal period of the encoder or the frequency generator is used. On the other hand, the sampling period for compensation control is preferably longer than the speed control period. The compensation control is carried out for the purpose of calculating the phase and the absolute value of the speed ripple (speed variation) within the respective $N_1$-th to $N_K$-th speed control regions in accordance with the formulas (5) to (7) on the basis of $N_1$ to $N_K$ times of speed information on the speed control samplings, and producing a new compensation signal after the $N_K$-th sampling. Namely, it is convenient that the compensation signal of the same phase and absolute vale is produced during the period from $N_1$-th to $N_K$-th samplings. Especially, according to this control method, since it is not necessary to store $N_1$ to $N_k$-th items of independent speed information in the respective RAM regions, it is possible to greatly reduce the RAM capacity in the case of a low frequency component. On the other hand, when many frequency components are contained, it is preferable that the compensation control periods for the respective frequency components are varied. Particularly, the compensation control period for a high frequency component should be positively changed from that for the other frequency components because the responsiveness is remarkably improved by making the compensation control period suitable for the corresponding frequency component.

FIG. 8 is a flowchart for executing the above-described control process by the microcomputer. Referring to FIG. 8, at the steps (1) and (2), the speed instruction $n_s$ and the speed $n_f$ are read out. At the step (3), the speed error $n_e$ is calculated from the thus-read speed instruction signal $n_s$ and actual speed signal $n_f$ ($n_e = n_s - n_f$). At the step (4), the calculation of the coefficients of the frequency components of the speed ripple (speed variation) is carried out according to the formulas (5) and (6) to obtain $A_{N1}(n)$ and $B_{N1}(n)$. At the step (5), it is judged whether or not the calculation for the period of one revolution of the motor is finished. If the calculation for the period of one rotation of the motor has been finished, $N_k$, $n_1$ are removed from the formula (5) and (6). At the step (6), the correction coefficient of a sine term $C_i(n)$ and the correction coefficient of a cosine term $D_i(n)$ are calculated and the results are stored and registered in the memory element (RAM). At the step (7), the compensation signal is calculated and at the step (8), the current instruction signal $I_s$ is output by multiplying the compensation signal by the output of the PI control of the speed control.

As set forth above, an embodiment of the present invention has been described. In an apparatus which is not provided with the automatic current regulator ACR, for example, the object of the present invention is achieved by supplying a voltage output in place of a current output.

FIG. 9 shows one example of a speed control system which is constructed in a digital system. In a VTR motor or the like which must be rotated at a constant speed, the speed control is generally executed at an interval equivalent to a pulse period obtained from an encoder or a frequency generator FG or several times as long an interval as the pulse period. In the example shown in FIG. 9, the pulse period is equal to the speed control period. When the encoder makes one revolution, 16 pulses are output. For the calculation of the n-th speed control, the information at the (n−1)-th signal period of the encoder or the frequency generator is used. On the other hand, the sampling period for the compensation control is preferably longer than the speed control period.

In FIG. 9, 16 pieces of speed information $f_1$ to $f_{16}$ are obtained during one revolution of the motor M. In the present invention, as to one component for two information ripples, for example, the second harmonic wave component, the ripples $A_{N2}$ and $B_{N2}$ are calculated from the formulas (5) and (6) on the basis of the speed information, $f_1$, $f_3$, $f_5$ and $f_7$. In order to obtain the correction terms, $C_{N2}$ and $D_{N2}$ in the formula (8) are calculated by multiplying $A_{N2}$ and $B_{N2}$ by, for example, a proportional constant $K_c$. It is possible to renew the value of the correction terms twice per revolution. On the other hand, as to the first harmonic wave component having one period per revolution, after the ripples $A_{N1}$ and $B_{N1}$ are calculated from the formulas (5) and (6) on the basis of the speed information, $f_2$, $f_4$, $f_6$, ... $f_{16}$, the correction terms are calculated in the same way as in the case of the first harmonic wave component. Naturally, in the case of the first harmonic wave component, the renewal of the value of the correction terms is executed one time per revolution. According to this system, one cycle of speed control is sufficed with only the calculation of the formulas (5), (6) either for the first or the second harmonic wave component, thereby shortening the calculation time. In this way, by staggering the timings either for detection or for outputting a correction by two harmonic wave component detecting and correcting portions, it is possible to shorten the calculation time within one cycle of speed control. By making the sampling period for detection and compensation of a short-period harmonic wave component shorter than the sampling period for detection and compensation of a long-period harmonic wave component, as shown in FIG. 9, the responsiveness with respect to a short period is enhanced.

Figure 10:
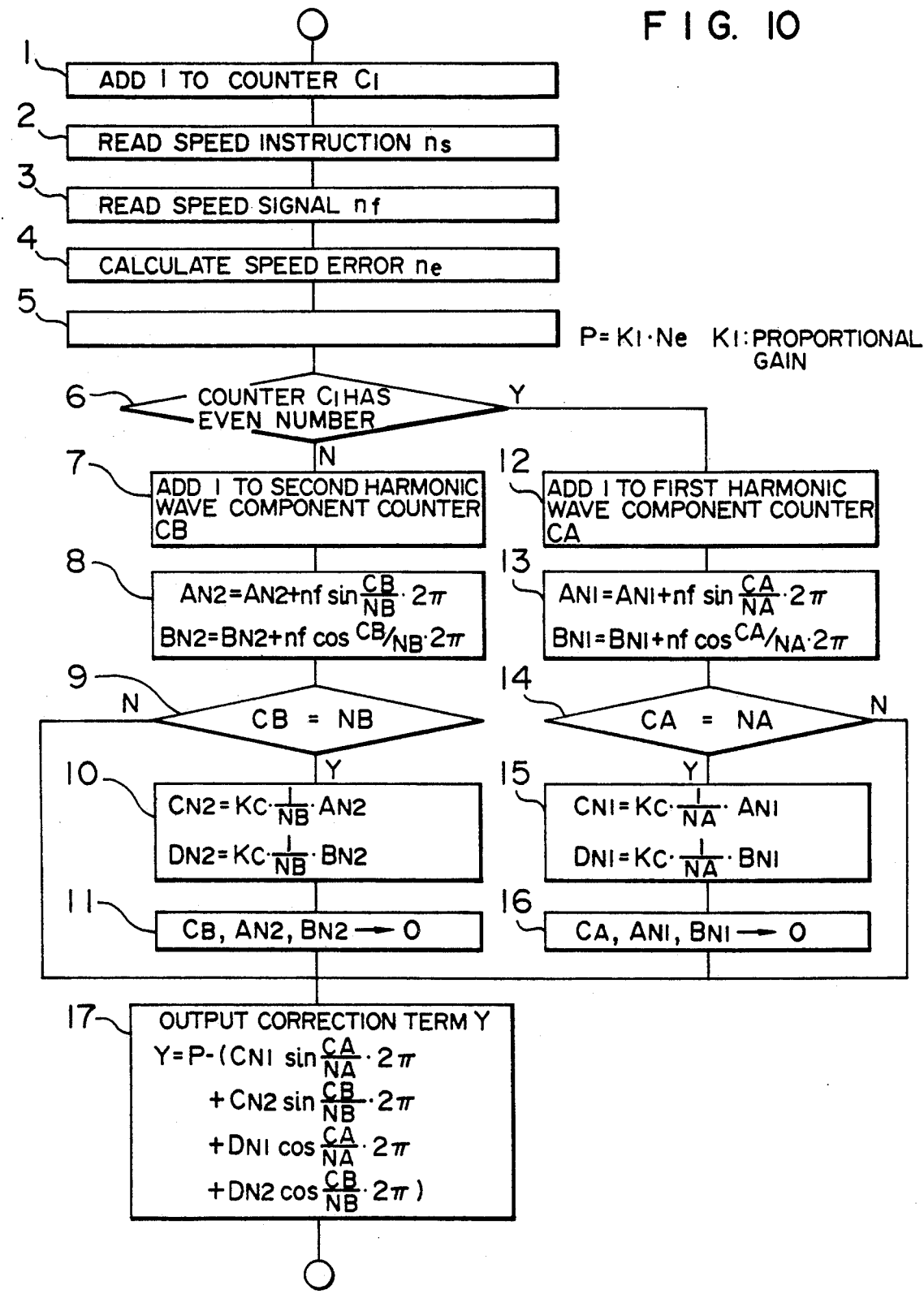
FIG. 10 is a flowchart showing the operation executed in the microcomputer.

FIG. 10 is a flowchart for executing the technique in accordance with the present invention by a microcomputer. Referring to FIG. 10, the value of the counter is increased by 1 (increment) at the step 1. The speed instruction $n_s$ is input, the speed signal $n_f$ is input, the speed error $n_e$ is calculated, and the output of the proportional term (shown in the example of proportional control) P is calculated at the steps 2, 3, 4, and 5 respectively. At the step 6, whether the first harmonic wave or the second harmonic wave is going to be calculated is determined. At the steps 7 to 11, the coefficient $A_{N2}$ of a sine term and the coefficient $B_{N2}$ of a cosine term of the second harmonic wave component are calculated and further the coefficients of the correction terms $C_{N2}$ and $D_{N2}$ are calculated. $A_{N2}$ and $B_{N2}$ are calculated at the steps 7 and 8, and after the confirmation of the completion of calculation at the step 9, the coefficients of the correction terms $C_{N2}$ and $D_{N2}$ are calculated at the step 10. At the step 11, the process is initialized. The steps 12 to 16 are related to the first harmonic wave and are completely the same as the steps 7 to 11. Finally, the output of the speed control system and the correction value are added, and the result is output at the step 17.

In FIG. 10, it is possible to shorten the calculation time in one cycle of speed control by adopting the alternate pieces of data of the speed information $n_f$ for the calculation of the first harmonic wave and the second harmonic wave, respectively. In addition, by providing separate counters for the first harmonic wave and the second harmonic wave, respectively, so as to increase the number of times of outputting the coefficients of the correction terms $C_{N2}$ and $D_{N2}$, it is possible to improve the responsiveness.

Since the counters are stopped during two cycles of speed control, the correction value of each harmonic wave is the same in this embodiment. However, it is possible to obtain different correction value by providing another counter and operating it during the speed control.

In this embodiment, correction values have been calculated by the Fourier expansion, but the method of calculating correction values in accordance with the present invention is applicable in completely the same way to the system of compensating the speed information through a digital filter. In this case, it is possible to store the speed information in memory and fetch the necessary number of items of data for calculation, as occasion demands. Alternatively, compensation such as that shown in FIG. 5 may be carried out without storing speed information in memory, wherein it is possible to introduce a given sampling during which compensation is carried out by a predetermined constant.

As described above, according to the present invention, it is possible to reduce the calculation time in one cycle of speed control and to improve the responsiveness.

We claim:

1. A speed control apparatus for a movable equipment comprising:
   a movable equipment;
   a speed detecting element for detecting a moving speed of said movable equipment; and
   speed control means for providing a current or a voltage to said movable equipment on the basis of a speed instruction signal;
   said speed control means including a driver for providing a current or a voltage having a magnitude corresponding to the speed instruction signal to said movable equipment, a speed detection circuit for detecting said moving speed of said movable equipment on the basis of a signal from said speed detecting element, and a microcomputer for driving said driver on the basis of a result of a comparison between said speed instruction signal and a speed signal obtained from said speed detection circuit;
   said microcomputer including harmonic wave component detecting means for detecting a harmonic wave component of a variation in said moving speed of said movable equipment on the basis of the speed signal obtained from said sped detection circuit, and gain varying means for varying a gain of a speed control system composed of said movable equipment, said speed detecting element, and said speed control means on the basis of said harmonic wave component detected by said harmonic wave component detecting means.

2. A speed control apparatus for a movable equipment according to claim 1, wherein said gain varying means varies said gain of said speed control system on the basis of a signal having a phase opposite to a phase of the detected harmonic wave component.

3. A speed control apparatus for a movable equipment according to claim 1, wherein said movable equipment is a motor which rotates or moves linearly.

4. A speed control apparatus for a movable equipment according to claim 1, wherein said gain varying means comprises means for obtaining from said detected harmonic wave component a periodic function having the same period as said detected harmonic wave component, and means for varying said gain of said speed control system on the basis of said periodic function.

5. A speed control apparatus for a movable equipment comprising:
   a movable equipment;
   control means for controlling said movable equipment;
   a driver for providing a current or a voltage to said movable equipment in correspondence with a speed instruction; and
   a speed detecting element for detecting a moving speed of said movable equipment;
   said control means including harmonic wave component detecting means for detecting a harmonic wave component of a variation of said moving speed of said movable equipment, and proportional-plus-integral control means for varying a gain of a control system composed of said movable equipment, said control means, said driver, and said speed detecting element on the basis of the detected harmonic wave component.

6. A speed control apparatus for a movable equipment according to claim 5, wherein said harmonic wave component detecting means detects said harmonic wave component by calculating a sine term $A_{N1}$ and a cosine term $B_{N1}$ from the following formulas on the basis of L items of moving speed information $V_n$ obtained from said speed detecting element, wherein $\theta_n$ represents a position of said movable equipment at which a corresponding item of moving speed information $V_n$ was obtained, and K is a constant:

$$A_{N1} = \frac{2}{L} K \sum_{n=1}^{L} V_n \sin\theta_n$$

$$B_{N1} = \frac{2}{L} K \sum_{n=1}^{L} V_n \cos\theta_n$$

and wherein said proportional-plus-integral control means varies said gain of said control system by calculating a correction coefficient $C_i$ of a sine term and a correction coefficient $D_i$ of a cosine term by subjecting said sine term $A_{N1}$ and said cosine term $B_{N1}$ to proportional-plus-integral control on the assumption that instructed coefficients of a sine term and a cosine term are zero, multiplying said correction coefficients $C_i$ and $D_i$ by a sine value and a cosine value, respectively, relating to a position of said movable equipment, adding the multiplied values together, and varying said gain of said control system on the basis of the sum of the multiplied values.

7. A speed control apparatus for a movable equipment according to claim 5, wherein said proportional-plus-integral control means comprises means for obtaining from said detected harmonic wave component a periodic function having the same period as said detected harmonic wave component, and means for varying said gain of said control system on the basis of said periodic function.

8. A digital control apparatus comprising:
   an object of control which produces a controlled variable;
   a detecting portion for detecting said controlled variable;
   a discriminating portion for calculating a deviation of said controlled variable detected by said detecting portion from a target value;
   a control portion for determining a manipulated value to be output to said object of control from said deviation, said control portion and said discriminating portion being provided with digital operators such as a microcomputer so as to output said manipulated value during each of a plurality of predetermined sampling periods; and a harmonic wave component detecting and correcting portion for reducing harmonic wave components of a variation in said controlled variable produced by said object of control by detecting a plurality of harmonic wave components of said variation in said controlled variable and correcting said manipulated value with correction values having the same periods as said plurality of harmonic wave components;

wherein respective timings for detecting said plurality of harmonic wave components or for outputting said correction values are staggered.

9. A digital control apparatus according to claim 8, wherein a period for the detection and correction of a harmonic wave component having a long period is longer than a period for the detection and correction of a harmonic wave component having a short period.

10. A digital control apparatus according to claim 8, wherein the detection and correction of harmonic wave components having different periods is carried out on the basis of data differing by at least one data item.

11. A digital control apparatus according to claim 8, wherein said object of control is a linear or rotary object and said controlled variable is a speed or a rate of rotation.

* * * * *